(12) United States Patent
Xu et al.

(10) Patent No.: US 11,784,600 B2
(45) Date of Patent: Oct. 10, 2023

(54) SYSTEMS AND METHODS FOR A SOFT SWITCHING DC-DC CONVERTER

(71) Applicant: General Electric Company, Schenectady, NY (US)

(72) Inventors: Fei Xu, Shanghai (CN); Kum-Kang Huh, Niskayuna, NY (US); Ahmed Elasser, Niskayuna, NY (US); Mohammed Agamy, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/834,304

(22) Filed: Dec. 7, 2017

(65) Prior Publication Data

US 2018/0212545 A1    Jul. 26, 2018

(30) Foreign Application Priority Data

Jan. 25, 2017    (CN) .......................... 201710061052.3

(51) Int. Cl.
*H02M 1/10*    (2006.01)
*H02P 27/06*    (2006.01)
(Continued)

(52) U.S. Cl.
CPC ............ *H02P 27/06* (2013.01); *H02M 3/158* (2013.01); *H02M 3/1582* (2013.01);
(Continued)

(58) Field of Classification Search
CPC ........ H02M 2001/0058; H02M 3/1582; H02P 2201/09; H02P 2201/11; H02P 27/06; Y02B 70/1491
See application file for complete search history.

(56) References Cited

U.S. PATENT DOCUMENTS 5,412,557 A    5/1995 Lauw
5,412,577 A    5/1995 Sainio et al.
(Continued)

FOREIGN PATENT DOCUMENTS

CN    1104002 A    6/1995
CN    101447743 A    6/2009
(Continued)

OTHER PUBLICATIONS

Zhang et al., "A new soft-switching technique for buck, boost, and buck-boost converters", IEEE Transactions on Industry Applications, vol. 39, Issue: 6, pp. 1775-1782, 2003.
(Continued)

*Primary Examiner* — Muhammad S Islam
(74) *Attorney, Agent, or Firm* — MEAGHER EMANUEL LAKS GOLDBERG & LIAO, LLP

(57) ABSTRACT

Systems and methods are provided for a soft switching topology for a direct current (DC)-DC converter. The systems and methods determine an operational status of an electric motor, and activate at least one of an upper or lower first or second semiconductor switches based on an operation of the electric motor. The first and second switching circuits are conductively coupled to a power inverter circuit. The systems and methods include deliver an adjusted voltage to one of the power inverter circuit or a power circuit based on the operational status of the electric motor.

20 Claims, 9 Drawing Sheets

(51) Int. Cl.
  *H02M 3/158* (2006.01)
  *H02M 1/00* (2006.01)
(52) U.S. Cl.
  CPC ....... *H02M 1/0058* (2021.05); *H02P 2201/09* (2013.01); *H02P 2201/11* (2013.01); *Y02B 70/10* (2013.01)

(56) References Cited

U.S. PATENT DOCUMENTS

| | | | |
|---|---|---|---|
| 5,594,635 A | 1/1997 | Gegner | |
| 6,370,050 B1 | 4/2002 | Peng et al. | |
| 7,382,113 B2 | 6/2008 | Wai et al. | |
| 7,812,575 B2 | 10/2010 | Shimada et al. | |
| 8,174,849 B2 | 5/2012 | Gekinozu | |
| 8,593,845 B2 | 11/2013 | Manabe | |
| 8,644,035 B2 | 2/2014 | Pahlevaninezhad et al. | |
| 9,093,912 B2 | 7/2015 | Henry | |
| 9,307,587 B1 | 4/2016 | Xiong | |
| 9,362,827 B2 | 6/2016 | Chang | |
| 9,419,522 B1 | 8/2016 | Khaligh et al. | |
| 2009/0046482 A1* | 2/2009 | Smith | H02M 3/33569 363/17 |
| 2009/0051346 A1* | 2/2009 | Manabe | B60L 11/1887 323/363 |
| 2009/0196072 A1* | 8/2009 | Ye | H02M 7/493 363/17 |
| 2011/0095742 A1* | 4/2011 | Lopata | H02M 3/1588 323/283 |
| 2012/0049773 A1* | 3/2012 | Muraho | H02P 27/06 318/400.3 |
| 2012/0112702 A1* | 5/2012 | Steigerwald | B60L 7/14 320/137 |
| 2012/0140524 A1* | 6/2012 | Manabe | H02M 3/3378 363/17 |
| 2013/0322126 A1* | 12/2013 | Pan | H02M 3/3353 363/17 |
| 2014/0217974 A1* | 8/2014 | Kim | B60L 53/22 320/109 |
| 2015/0048810 A1 | 2/2015 | Terui et al. | |
| 2015/0194909 A1 | 7/2015 | Pahlevaninezhad et al. | |
| 2015/0229252 A1* | 8/2015 | Toba | H02M 7/5387 318/400.27 |
| 2015/0318784 A1* | 11/2015 | Wu | H02M 3/158 323/283 |
| 2016/0043631 A1 | 2/2016 | Hung et al. | |
| 2016/0094133 A1 | 3/2016 | Sasaki et al. | |
| 2016/0099647 A1 | 4/2016 | Zhang et al. | |
| 2016/0111964 A1 | 4/2016 | Oki et al. | |
| 2016/0141960 A1 | 5/2016 | Huang et al. | |
| 2016/0152129 A1 | 6/2016 | West et al. | |
| 2018/0154787 A1* | 6/2018 | Chen | B60L 11/1816 |

FOREIGN PATENT DOCUMENTS

| | | |
|---|---|---|
| CN | 101577489 A | 11/2009 |
| CN | 103715923 A | 4/2014 |
| CN | 103036430 B | 4/2015 |
| CN | 104578773 A | 4/2015 |
| CN | 104604089 A | 5/2015 |
| CN | 104737432 A | 6/2015 |
| CN | 102832809 B | 8/2015 |
| CN | 105207486 A | 12/2015 |
| JP | 2005-261059 A | 9/2005 |
| JP | 4562961 B2 | 10/2010 |
| JP | 2011097740 A | 5/2011 |
| JP | 2016025831 A | 2/2016 |
| JP | 2016-092854 A | 5/2016 |
| KR | 20100114751 A | 10/2010 |
| KR | 101395569 B1 | 5/2014 |
| TW | I262646 B | 9/2006 |
| TW | 201308840 A | 2/2013 |
| TW | I465024 B | 12/2014 |

OTHER PUBLICATIONS

Gang et al., "A Novel Soft Switching Bidirectional DC/DC Converter and Design Consideration", Power Electronics and Motion Control Conference, 2006. IPEMC 2006. CES/IEEE 5th International, pp. 1-4, 2006, Shanghai.

Waffler et al., "A novel low-loss modulation strategy for high-power bi-directional buck+boost converters", Power Electronics, 2007. ICPE '07. 7th Intematonal Conference on, pp. 889-894,2007, Daegu.

Elmes et al., "Modular bidirectional DC-DC converter for hybrid/ electric vehicles with variable-frequency interleaved soft-switching", Vehicle Power and Propulsion Conference, 2009. VPPC '09. IEEE, pp. 448-454,2009, Dearborn, MI.

H L Do, "Nonisolated Bidirectional Zero-Voltage-Switching DC-DC Converter", IEEE Transactions on Power Electronics,vol. 26, Issue: 9, pp. 2563-2569, 2011.

Mohammadi et al., "New Family of Zero-Voltage-Transition PWM Bidirectional Converters With Coupled Inductors", IEEE Transactions on Industrial Electronics, vol. 59, Issue: 2, pp. 912-919, 2012.

Jung et al., "Soft-Switching Bidirectional DC/DC Converter with a LC Series Resonant Circuit", IEEE Transactions on Power Electronics, vol. 28, Issue: 4, pp. 1680-1690, Apr. 2013.

Lee et al., "Auxiliary Switch Control of a Bidirectional Soft-Switching DC/DC Converter", IEEE Transactions on Power Electronics, vol. 28, Issue: 12, pp. 5446-5457, Dec. 2013.

Varshney et al., "Soft-Switched Boost DC-DC Converter System for Electric Vehicles using an Auxiliary Resonant Circuit", International Journal of Emerging Technology and Advanced Engineering, vol. 4, Issue: 3, Mar. 2014.

Kwon et al., "High Gain Soft-Switching Bidirectional DC-DC Converter for Eco-Friendly Vehicles", IEEE Transactions on Power Electronics, vol. 29, Issue: 4, pp. 1659-1666, Apr. 2014.

Yang et al., "Soft-Switching Bidirectional DC-DC Converter Using a Lossless Active Snubber", IEEE Transactions on Circuits and Systems I: Regular Papers, vol. 61, Issue: 5, pp. 1588-1596, May 2014.

Chao et al., "Bidirectional DC-DC soft-switching converter for stand-alone photovoltaic power generation systems", in IET Power Electronics, vol. 7, issue: 6, pp. 1557-1565, Jun. 2014.

Zhang et al.,"Analysis and Design of a New Soft-Switching Boost Converter With a Coupled Inductor", IEEE Transactions on Power Electronics, vol. 29, Issue: 8, pp. 4270-4277, Aug. 2014.

English Translation and First Chinese Office Action and Search Report for corresponding CN 201710061052.3, dated Aug. 23, 2019.

Second Chinese Office Action for corresponding CN 201710061052. 3, dated Apr. 26, 2020.

English Translation of Japanese Office Action for corresponding JP Application No. 2018-003029, dated Nov. 15, 2021.

Umetani et al., "Passive regenerative turn-off snubber composed of two diodes and a capacitor for two-phase interleaved boost chopper", 2015 IEEE Intn'l Telecommunications Energy Conf. (INTELEC), Oct. 22, 2015.

English translation of Korean Office Action for corresponding KR Application No. 1020180008307, dated Sep. 29, 2021.

* cited by examiner

SYSTEMS AND METHODS FOR A SOFT SWITCHING DC-DC CONVERTER

FIELD OF INVENTION

Embodiments of the subject matter described herein relate to a soft switching topology for a bi-directional direct current (DC)-DC converter.

BACKGROUND OF THE INVENTION

Hybrid and electric vehicles (HEVs) have recently become widespread in response to a growing concern about global environment conservation. Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration.

The HEVs include a bi-directional DC-DC converter. The bi-directional DC-DC converter transitions voltages between the energy storage device and an inverter. The inverter provides electrical power to the electric motor and/or receives electrical power from one or more components of the HEVs, such as regenerative braking. The bi-directional DC-DC converter adjusts a voltage from the energy storage device to the inverter to provide power to the electric motor. Additionally, the DC-DC converter adjust a voltage from the inverter to charge the electric storage device.

However, the input DC voltage to the inverter has to be regulated and variable in order to drive high-speed, high-power motors, and improve the overall efficiency and power density of the inverter. Thus, a high power, high efficiency bi-directional DC-DC converter with high voltage gain is preferred. In an HEV conventional bi-directional DC-DC converter, hard switching is commonly used for simplicity purposes. However, efficiency is low due to the large energy losses involved in switching at turn-on and at turn-off. In addition, high frequency operation is required to achieve high power density, improve dynamic performance, and reduce acoustic noise. The switching frequency of hard switching converters is limited due to the high energy losses and EMI issues. Thus, a need exists for a soft switching topology for a bi-directional DC-DC converter.

BRIEF DESCRIPTION OF THE INVENTION

In an embodiment a system (e.g., a soft switching system for a direct current (DC)-DC converter) is provided. The system includes a first switching circuit having an upper first semiconductor switch and a lower first semiconductor switch. The system includes a second switching circuit having an upper second semiconductor switch and a lower second semiconductor switch. The first and second switching circuits are conductively coupled to a DC bus. The system includes a coupling circuit conductively coupled to a first and second node. The first node is interposed between the upper and lower first semiconductor switches, and the second node is interposed between the upper and lower second semiconductor switches. The system further includes a power circuit conductively coupled to the first node.

In an embodiment a method (e.g., for soft switching a direct current (DC)-DC converter) is provided. The method includes determining an operational status of an electric motor, activating at least one of an upper or lower first or second semiconductor switches based on an operation of the electric motor. The first and second switching circuits are conductively coupled to a power inverter circuit. The method includes delivering an adjusted voltage to one of the power inverter circuit or a power circuit based on the operational status of the electric motor.

In an embodiment a method is provided. The method includes providing a direct current (DC)-DC converter having a soft switching topology. The DC-DC converter includes a first switching circuit having an upper first semiconductor switch and a lower first semiconductor switch. The soft switching topology having a second switching circuit having an upper second semiconductor switch and a lower second semiconductor switch. The first and second switching circuits are conductively coupled to a power inverter circuit. The soft switching topology includes a coupling circuit conductively coupled to a first and second node. The first node is interposed between the upper and lower first semiconductor switches, and the second node is interposed between the upper and lower second semiconductor switches. The DC-DC converter includes a power circuit conductively coupled to the first node. The method includes measuring an operational status of an electric motor, activating at least one of the upper or lower first or second semiconductor switches based on an operational status of the electric motor, and delivering an adjusted voltage to one of the power inverter circuit or the power circuit based on the operational status of the electric motor.

DETAILED DESCRIPTION

Figure 1:
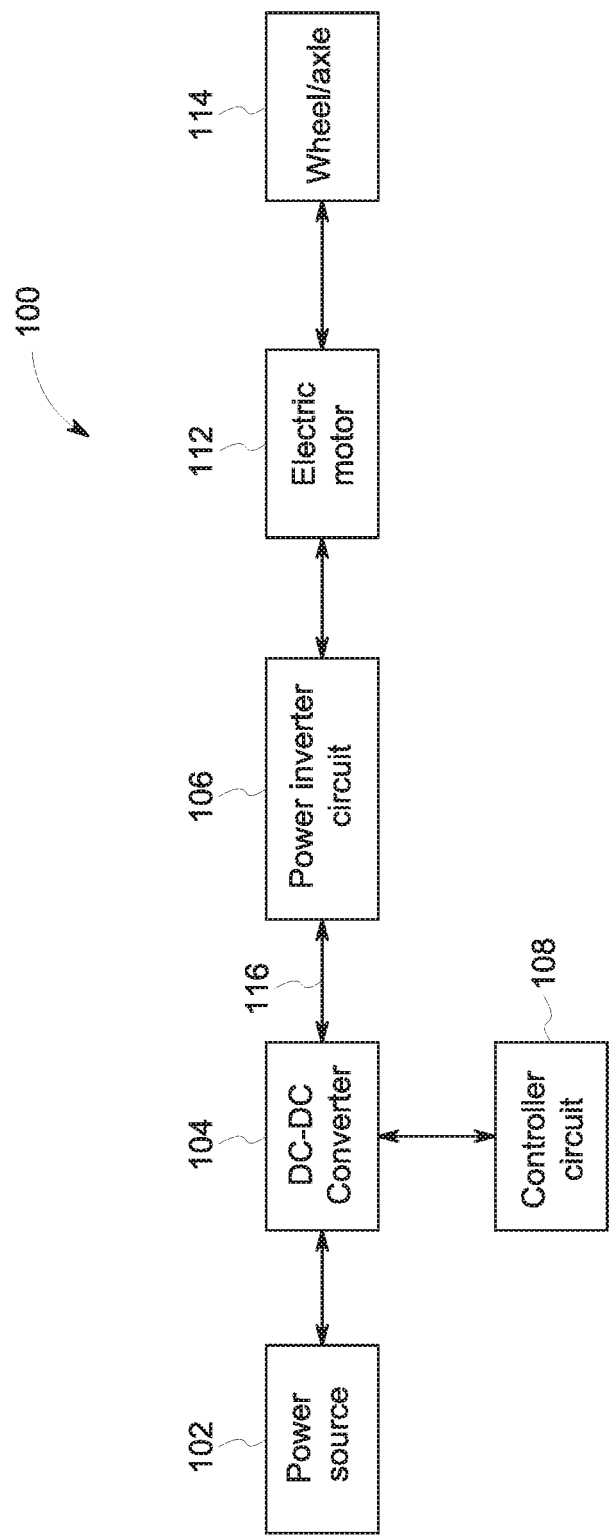
FIG. 1 illustrates a schematic block diagram of an embodiment of a traction system.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide methods and systems for a soft switching topology for a bi-directional direct current (DC)-DC converter. The bi-directional DC-DC converter is conductively (e.g., electrically) coupled to a power source (e.g., energy storage device) and a load (e.g., inverter). In an embodiment, a bi-directional DC-DC converter includes a switching circuit having an upper and lower semiconductor switch, and an auxiliary switching circuit having an upper and lower second semiconductor switch. The switching circuit is conductively coupled to the power source via a power circuit, such as an inductor conductively coupled in series with the power source. The switching circuit and the auxiliary switching circuit are conductively (e.g., electrically) coupled to a coupling circuit that may be configured as a snubber circuit (e.g., include a capacitor), which is configured to achieve zero-voltage switching (ZVS) at turn-off of the switching circuit. The upper and lower switches of the auxiliary switching circuit are configured to connect the coupling circuit in parallel to the upper or lower semiconductor switch of the switching circuit based on the power flow. The electrical energy stored in the coupling circuit is recovered to the power source by a negative current of the power circuit, depleting the electrical energy of the power circuit corresponding to a discontinuous conduction mode (DCM) operation.

Additionally or alternatively, a second auxiliary switching circuit may be conductively coupled to the auxiliary switching circuit to operate the bi-directional DC-DC converter in either a DCM or a continuous conduction mode (CCM). The second auxiliary switching circuit includes an upper and lower semiconductor switch. The auxiliary switching circuit is conductively coupled to the second auxiliary switching circuit via a resonant component, such as an inductor. The resonant circuit and the second auxiliary switching circuit are configured to achieve soft switching under CCM operation. For example, the electrical energy stored in the coupling circuit (e.g., the capacitor of the coupling circuit) can be transferred to the resonant inductor, which is then supplied to the load without depleting the electrical energy of the power circuit.

At least one technical effect of various embodiments provides a higher system efficiency with an adjustable DC bus voltage, high power density, low electromagnetic interference, and/or modularity for easy paralleling relative to conventional bi-directional DC-DC converters. At least one technical effect of various embodiments provides low cost, easy installation and maintenance, and/or modularity for high power rating.

FIG. 1 illustrates a schematic block diagram of an embodiment of a traction system 100. For example, the traction system 100 may be usable in a vehicle (e.g., automobile, locomotive, airplane, boat, and/or the like), such as a hybrid vehicle, electric vehicle, plug-in electric and/or hybrid vehicle, and/or the like. Traction system 100 includes a power source (e.g., energy storage device) 102 and a power inverter circuit 106 (e.g., load). The power source 102 may be a battery, fuel cell, an ultra-capacitor, and/or the like. The power inverter circuit 106 may represent a bi-directional DC to AC (e.g., alternating current) inverter electrically coupled to a DC-DC converter 104 via a DC bus 116 and an electric motor 112 (e.g., electromechanical device or machine). For example, the power inverter circuit 106 may include one or more phase modules based on a number of phase tractions of the electric motor 112. The electric motor 112 may be mechanically coupled to one or more driving wheels or axles 114 of the vehicle (not shown). It may be noted in an embodiment, such as for non-vehicle propulsion systems, the drive wheels 76 may be a pulsed load (not shown), including a pump, fan, winch, crane, propeller, and/or other motor driven loads.

The DC-DC converter 104 and the power inverter circuit 106 may be controlled by a controller circuit 108. The controller circuit 108 may be embodied in hardware, such as one or more processors, controller, or other logic-based device, that performs functions or operations based on one or more sets of instructions (e.g., software). Additionally or alternatively, the controller circuit 108 may be an application specific integrated circuit, a field programmable gate array, and/or the like configured to control the DC-DC converter 104 and the power inverter circuit 106. The instructions on which the hardware operates may be stored on a tangible and non-transitory (e.g., not a transient signal) computer readable storage medium, such as memory. The memory may include one or more computer hard drives, flash drives, RAM, ROM, EEPROM and/or the like. Alternatively, one or more of the sets of instructions that direct operations of the hardware may be hard-wired into the logic of the hardware.

The controller circuit 108 is configured to control the power inverter circuit 106 to convert a DC voltage and/or current received along the DC bus 116 to an AC voltage and/or current for the electric motor 112. For example, the controller circuit 108 may instruct the bi-directional DC-DC converter to boost (e.g., increasing the DC voltage) a DC voltage and/or current from the power source 102 to a higher DC voltage and/or current along the DC bus 116. The boosted DC voltage along the DC bus 116 is received by the power inverter circuit 106 and is converted into an AC voltage and/or current, which is delivered to the electric motor 112 and the drive wheels 114.

Additionally or alternatively, the electric motor 112 may generate energy when in a generating mode, such as when the vehicle brakes are activated (e.g., regenerative braking), the rotors speed of the electric motor 112 are beyond the synchronous speed provided by the power inverter circuit 106, and/or the like. For example, the electric motor 112 may be operated as a generator when brakes of the drive wheels 112 are activated, which supplies an AC voltage and/or current to the power inverter circuit 106 for inversion into a DC voltage and/or current along the DC bus 116. The controller circuit 108 may instruct the bi-directional DC-DC converter to buck (e.g., decrease the DC voltage) the DC voltage and/or current into another DC voltage and/or current that is configured to recharging and/or charge the power source 102.

Figure 2:
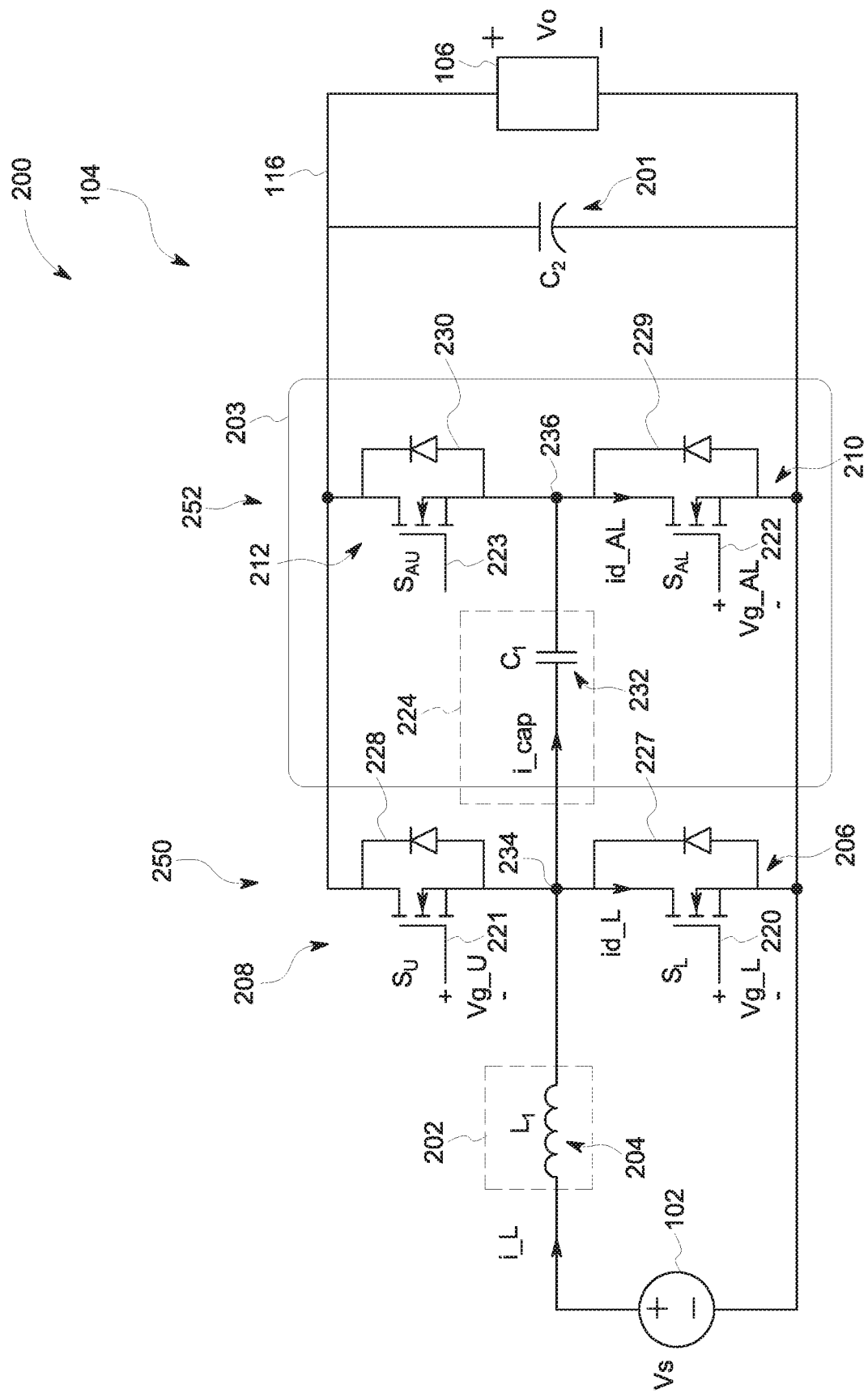
FIG. 2 illustrates a schematic illustration of an embodiment of a soft switching topology for a bi-directional DC-DC converter configured to operate in a discontinuous conduction mode.

FIG. 2 illustrates a schematic illustration 200 of an embodiment of a soft switching topology 203 for the bi-directional DC-DC converter 104 shown configured to operate in a discontinuous conduction mode. The DC-DC converter 104 may include a switching circuit 250, a power circuit 202, the DC bus 116 and an output capacitor 201. The DC-DC converter 104 is conductively coupled to the soft switching topology 203. The soft switching topology 203 includes an auxiliary switching circuit 252 and a coupling circuit 224.

The switching circuits 250, 252 are conductively coupled to the power inverter circuit 106 via the DC bus 116. The switching circuits 250, 252 include upper semiconductor switches 208, 212 and lower semiconductor switches 206, 210. The upper and lower semiconductor switches 206, 208, 210, 212 are illustrated as metal oxide semiconductor field effect transistor (MOSFETS). However, the upper and lower semiconductor switches 206, 208, 210, 212 may be insulated gate bipolar transistors (IGBTs), bipolar junction transistors (BJTs), metal oxide semiconductor controller thyristors (MCTs), and/or the like. It may be noted that the semiconductor switch fabrication may include Silicon (Si), Silicon Carbide (SiC), Gallium Nitride (GaN), and/or the like. The upper and lower semiconductor switches 206, 208, 210, 212 each may include a diode 228-230 in anti-parallel with respect to the corresponding upper and lower semiconductor switches 206, 208, 210, 212. Additionally or alternatively, the diodes 228-230 may be integrated into the upper and lower semiconductor switches 206, 208, 210, 212.

The switching circuit 250 is conductively (e.g., electrically) coupled to a power circuit 202 at node 234 interposed between the upper and lower semiconductor switches 206, 208. The power circuit 202 is conductively coupled to the power source 102. The power circuit 202 is illustrated having an inductor 204 and/or coil configured in series with the node 234 to the power source 102. For example, the power circuit 202 includes the inductor 204 conductively coupled to the power source 102 in series. The power circuit 202 is configured to store electrical energy and to discharge electrical energy of the coupling circuit 224.

The coupling circuit 224 is conductively coupled to the node 234 and the node 236. The node 236 is interposed between the upper and lower semiconductor switches 210, 212. For example, based on the nodes 234, 236 the coupling circuit 224 is conductively coupled in parallel between the switching circuit 250 and the auxiliary switching circuit 252. Optionally, the coupling circuit 224 is configured to be a snubbing circuit by preventing voltage spikes between the switching circuits 250, 252. For example, the coupling circuit 224 may include a capacitor 232.

The controller circuit 108 may be conductively coupled to the switching circuits 250, 252 via a control bus (not shown). The controller circuit 108 is configured to adjust an electrical characteristic (e.g., voltage, current) along the controller bus to control the activation and/or deactivation of the switching circuits 250, 252. For example, the control bus may include a plurality of conductive wires conductively coupling gate terminals 220-223 of the upper and lower semiconductor switches 206, 208, 210, 212 to the controller circuit 108. The controller circuit 108 may adjust voltages along the control bus to one or more of the gate terminal 220-223 enabling the controller circuit 108 to activate (e.g., voltage at the gate above a threshold) at least one of the upper and/or lower semiconductor switches 206, 208, 210, 212. The controller circuit 108 may activate and/or deactivate at least one of the upper and/or lower semiconductor switches 206, 208, 210, 212 at predetermined time periods based on an operational status of the electric motor 112. The operational status of the electric motor 112 may represents a generating mode or a traction mode.

During the generating mode, the electric motor 112 is configured as a generator, for example, when the brakes of the vehicle are activated (e.g., regenerative braking), rotor speed of the electric motor 112 is over a synchronous speed provided by the power inverter circuit 106 (e.g., induction generator), and/or the like. During the traction mode, the electric motor 112 is configured to provide a tractive effort to the drive wheels 114 of the vehicle. For example, the electric motor 112 is providing a rotational force to the drive wheels 114 during the traction mode. The controller circuit 108 may determine the operational status of the electric motor 112 based on a sensor (not shown) measuring a voltage and/or current of the DC bus 116. Additionally or alternatively, the controller circuit 108 may determine the operational status of the electric motor 112 based on operation of the vehicle, such as by activation of pedals of the vehicle. For example, activation of the gas and/or accelerator pedal may indicate to the controller circuit 108 that the electric motor 112 is operating in the traction mode. Alternatively, activation of the brake pedal may indicate to the controller circuit 108 that the electric motor 112 is operating in the generating mode.

Figure 3:
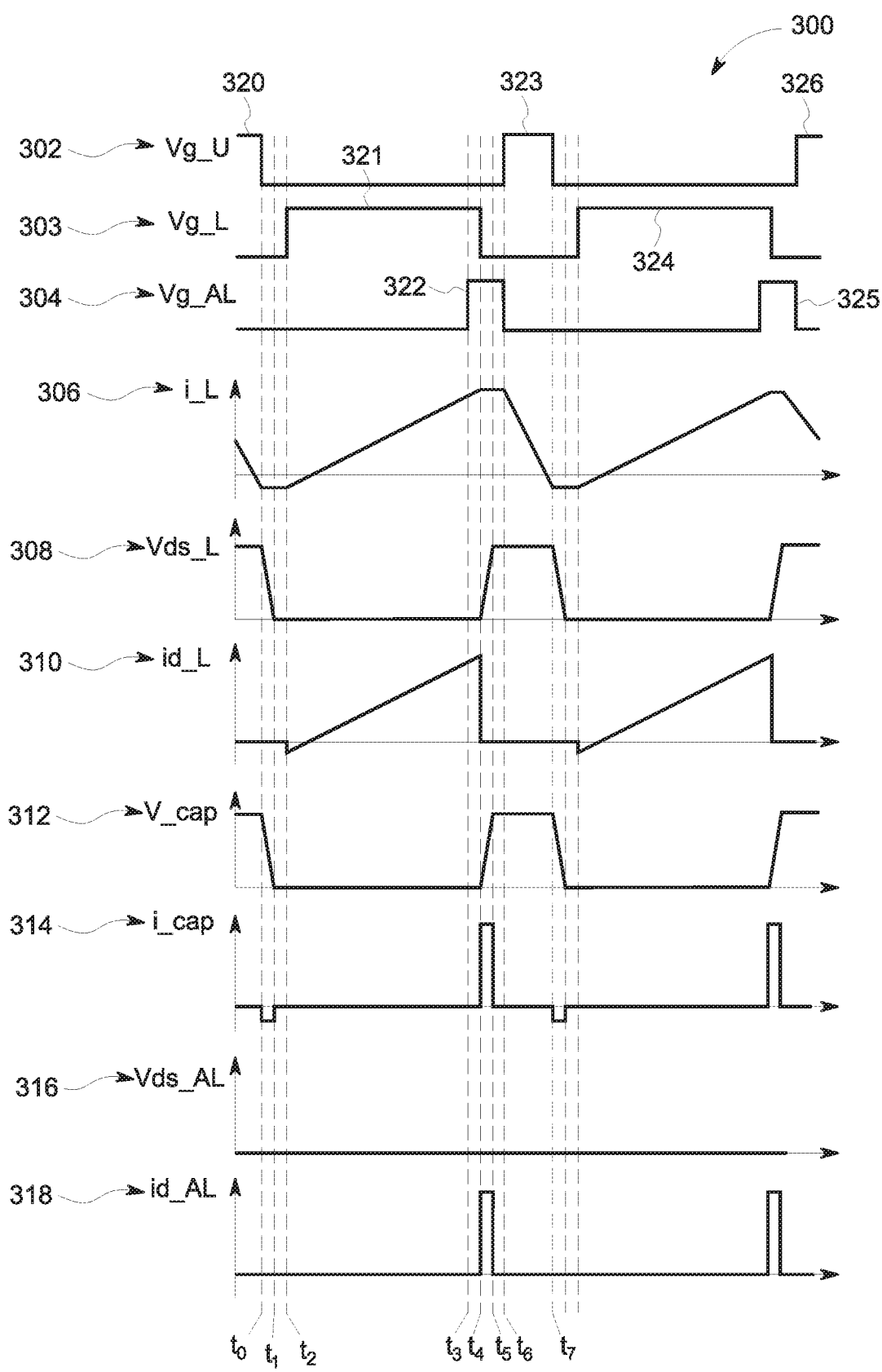
FIG. 3 illustrates a timing diagram of an embodiment of electrical waveforms of the bi-directional DC-DC converter shown in FIG. 2.

In connection with FIG. 3, based on the operational mode of the electric motor 112 the controller circuit 108 may activate and/or deactivate at least one of the upper and/or lower semiconductor switches 206, 208, 210, 212 at predetermined intervals. For example, the timing diagram 300 shows the activation and/or deactivation of at least one of the upper and/or lower semiconductor switches 206, 208, 210, 212 to boost a DC voltage and/or current received by the power circuit 202 from the power source 102 to the power inverter circuit 106 based on the traction mode of the electric motor 112.

FIG. 3 illustrates a timing diagram 300 of an embodiment of electrical waveforms of the bi-directional DC-DC converter 104 shown in FIG. 2. The electrical waveform 306 represents a current of the power circuit 202. It may be noted that the current shown in the electrical waveform 306 is shown crossing zero indicating the bi-directional DC-DC converter 104 with the soft switching topology 203 is operating in a discontinuous conduction mode. The electrical waveform 308 represents a voltage at the node 234. The electrical waveform 310 represents a current through the lower semiconductor switch 206. The electrical waveform 312 represents a voltage across the capacitor 232 and the electrical waveform 314 represents a current through the coupling circuit 224. The electrical waveform 316 represents a voltage across the lower semiconductor switch 210 and the electrical waveform 318 represents a current through the lower semiconductor switch 210. It may be noted that the electrical waveform 316 for the timing diagram 300 is illustrated having a zero voltage.

The electrical waveforms 302-304 represent a voltage along the control bus received by the switching circuits 250, 252. The electrical waveform 302 represents a voltage of the gate terminal 221, the electrical waveform 303 represents a voltage of the gate terminal 220, and the electrical waveform 303 represents a voltage of the gate terminal 222. The electrical waveforms 302-304 include voltage peaks 320-325 representing activation of the corresponding semiconductor switches 206, 208, 210. For example, the voltage peaks 320-325 may represent voltage values over a threshold voltage of the semiconductor switches 206, 208, 210 activating the corresponding semiconductor switches 206, 208, 210. A timing of the voltage peaks 320-325, such as the activation of the semiconductor switches 206, 208, 210, is configured to boost the DC voltage received from the power supply 102 to the DC bus 116, which is received by the power inverter circuit 106.

The timing diagram 300 is subdivided into set time periods and/or divisions (e.g., $t_0$-$t_7$) based on the voltage peaks 320-325 representing a boost operation of the DC-DC converter 104 with the soft switching topology 203. At $t_0$, the controller circuit 108 deactivates the upper semiconductor switch 208 by adjusting the voltage along the control bus conductively coupled to the gate terminal 221 below the voltage threshold of the upper semiconductor switch 208. As shown between $t_0$ and $t_1$ of the electrical waveform 312, voltage of the coupling circuit 224 is discharged. For example, a current traverses along the diode 229 through the coupling circuit 224 and the power circuit 202 (e.g., shown as a negative current by the electrical waveform 306).

At $t_1$, the voltage across the coupling circuit 224 is discharged (e.g., 0), and current traverses through the diode 227 and the power circuit 202. For example, a negative current through the power circuit 202 is constant, as shown in the electric waveform 306, between $t_1$ and $t_2$. It may be noted that the negative current may be utilized to charge the power source 102.

At $t_2$, the controller circuit 108 activates the lower semiconductor switch 206 by adjusting the voltage along the control bus, shown as the voltage peak 321, conductively coupled to the gate terminal 220 above the voltage threshold. It may be noted the activation of the lower semiconductor switch 206 represents a zero voltage switching. For example, the negative current through the power circuit 202 held the voltage across the lower semiconductor switch 206 at zero, shown by the electric waveform 308 at $t_2$. With the activation of the lower semiconductor switch 206, current traverses from the power circuit 202 across the lower semiconductor switch 206 increasing linearly through the power circuit 202 (e.g., charging the inductor 204 of the power circuit 202).

At $t_3$, the controller circuit 108 activates the lower semiconductor switch 210 by adjusting the voltage along the control bus, shown as the voltage peak 322, conductively coupled to the gate terminal 222 above the voltage threshold. It may be noted the activation of the lower semiconductor switch 210 represents a zero voltage switching. For example, due to the activation of the lower semiconductor switch 206 a voltage at the nodes 234 and 236 are zero when the lower semiconductor switch 210 is activated, as shown in the electric waveform 316. Additionally, a current through the lower semiconductor switch 210 is zero, as shown in the electric waveform 318. It may be noted that the current through the power circuit 202 continues to increase linearly, as shown in the electric waveform 306.

At $t_4$, the controller circuit 108 deactivates the lower semiconductor switch 206 by adjusting the voltage along the control bus conductively coupled to the gate terminal 220 below the voltage threshold of the lower semiconductor switch 206. Based on the deactivation of the lower semiconductor switch 206, current traverses along the power circuit 202 to the coupling circuit 224 and through the lower semiconductor switch 210 thereby charging the coupling circuit 224 as shown in the electric waveforms 312 and 314 and producing a voltage at the node 234 (shown at the electric waveform 308). The voltage at node 234 increases linearly, and is received at the DC bus 116 across the diode 228 at a controlled rate of rise defined by the coupling circuit 224 and a load current through the DC bus 116. For example, the controller rate may be based on the electrical properties (e.g., capacitance) of the capacitor 232 of the coupling circuit 224.

At $t_5$, the current through the power circuit 202 continues to flow through the diode 228 and to the DC bus 116.

At $t_6$, the controller circuit 108 activates the upper semiconductor switch 208 by adjusting the voltage along the control bus, shown as the voltage peak 323, conductively coupled to the gate terminal 221 above the voltage threshold. Additionally, the controller circuit 108 deactivates the lower semiconductor switch 210 by adjusting the voltage along the control bus conductively coupled to the gate terminal 222 below the voltage threshold of the lower semiconductor switch 210. It may be noted the activation of the upper semiconductor switch 208 represents a zero voltage switching. For example, power circuit 202 continually discharges energy (e.g., current, voltage) to the DC bus 116 across the diode 228 (shown in $t_5$), which held the voltage across the upper semiconductor 208 to zero thereby enabling zero voltage switching. The power circuit 202 continually discharges as represented by the linear reduction in current shown in the electric waveform 306.

The controller circuit 108 may continually and/or intermittently repeat the time periods $t_0$-$t_7$ based on the operational mode of the electric motor 112 to boost a DC voltage and/or current. The soft switching topology 203 is configured to enable the DC-DC converter 104 to operate similar and/or the same operations (e.g., buck, boost) between the power source 102 and the power inverter circuit 106.

For example, when the controller circuit 108 determines an operational mode of the electric motor 112 to be the generating mode, the controller circuit 108 may instruct the bi-directional DC-DC converter 104 with the soft switching topology 203 to buck (e.g., decrease the DC voltage) the DC voltage and/or current received from the power inverter circuit 106 into another DC voltage and/or current that is configured to recharging and/or charging the power source 102. In an embodiment, the controller circuit 108 is configured to reduce a voltage received by the power inverter circuit 106 based on activations and/or deactivations of at least one of the upper and/or lower semiconductor switches 206, 208, 210, 212 at predetermined intervals. The controller circuit 108 may switch the activation and/or deactivation of the upper and/or lower semiconductor switches 206, 208, 210, 212 relative to the timing diagram 300 to reduce the voltage and/or current along the DC bus 116 and delivered to the power source 102. For example, the controller circuit 108 may activate the lower switch 210 at $t_2$ until $t_4$, the lower switch 206 at $t_3$ until $t_6$, and the upper switch 212 at $t_6$ until $t_7$.

The DC-DC converter 104 with the soft switching topology 203 shown in FIG. 2 is shown operating in the discontinuous conduction mode. In connection with FIG. 4, the DC-DC converter 104 with the soft switching topology 403 may be configured to operate in a discontinuous conduction mode and/or a continuous conduction mode.

Figure 4:
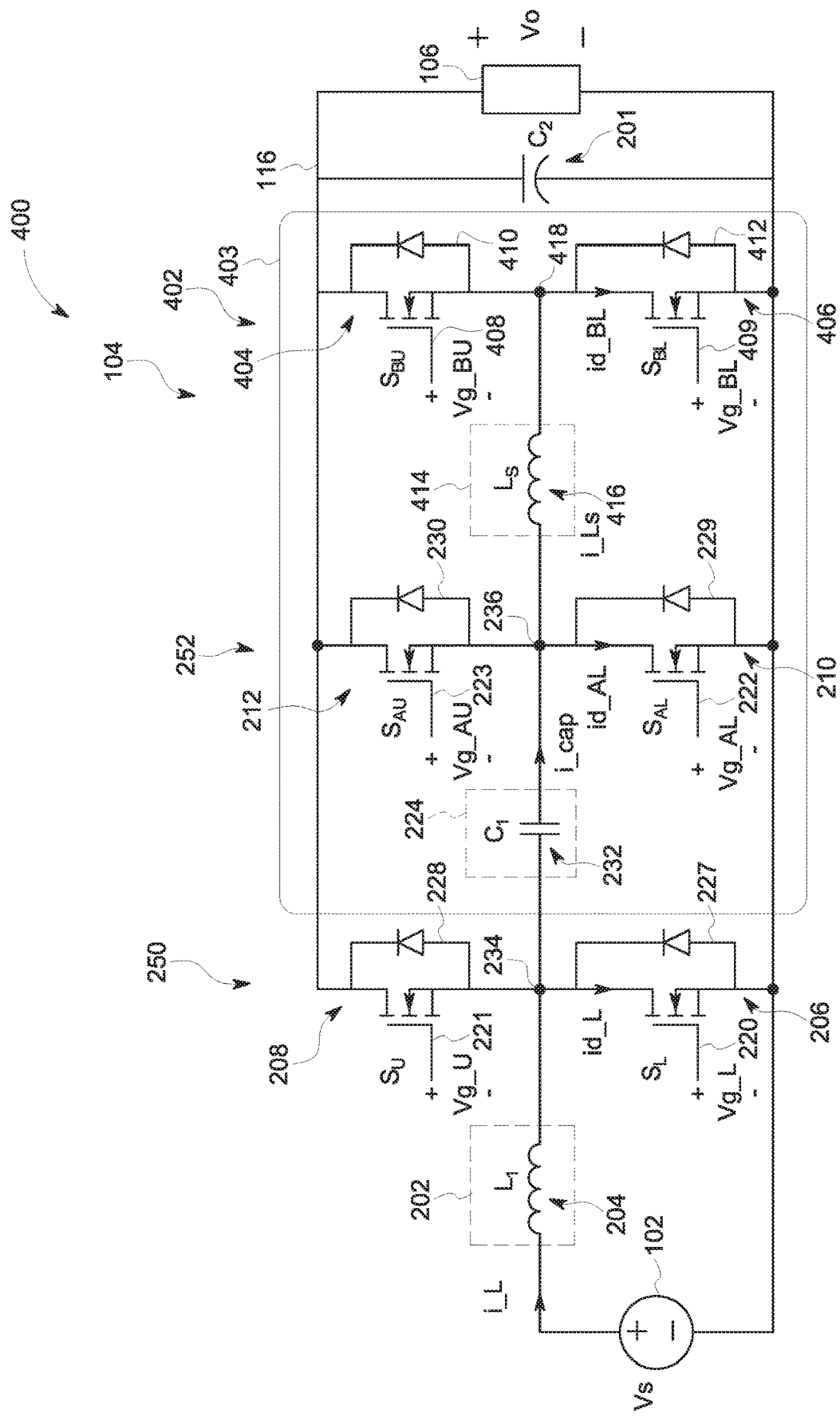
FIG. 4 illustrates a schematic illustration of an embodiment of a soft switching topology for a bi-directional DC-DC converter configured to operate in continuous or discontinuous conduction modes.

FIG. 4 illustrates a schematic illustration 400 of an embodiment of a soft switching topology 403 for a bi-directional DC-DC converter 104 configured to operate in continuous or discontinuous conduction modes. The schematic illustration 400 includes a second auxiliary switching circuit having an upper semiconductor switch 404 and a lower semiconductor switch 406. For example, the upper and lower semiconductor switches 404 and 406 may be similar to and/or the same as the upper and/or lower semiconductor switches 206, 208, 210, 212. The upper and lower semiconductor switches 404 and 406 each may include a diode 410, 412 in anti-parallel with respect to the corresponding upper and lower semiconductor switches 404 and 406. Additionally or alternatively, the diodes 410, 412 may be integrated into the upper and lower semiconductor switches 404 and 406.

The schematic illustration 400 includes a resonant circuit 414 conductively coupled to the node 236 and a node 418. The node 418 is interposed between the upper and lower semiconductor switches 404 and 406. The resonant circuit 414 may include an inductor 416 and/or coil. The resonant circuit 414 is configured to receive and/or transfer energy stored in the coupling circuit 224, which is subsequently supplied to the DC bus 116 and the power converter circuit 106.

The controller circuit 108 is conductively coupled to the switching circuits 250, 252, and 402 via the control bus. For example, the controller circuit 108 is configured to adjust an electrical characteristic (e.g., voltage, current) along the controller bus to control the activation and/or deactivation of the switching circuits 250, 252 and 402. The control bus may include a plurality of conductive wires conductively coupling gate terminals 220-223, 408-409 of the upper and lower semiconductor switches 206, 208, 210, 212, 404, 406 to the controller circuit 108. The controller circuit 108 may adjust voltages along the control bus to one or more of the gate terminal 220-223, and 408-409 enabling the controller circuit 108 to activate (e.g., voltage at the gate above a threshold) at least one of the upper and/or lower semiconductor switches 206, 208, 210, 212, 404 and 406. The controller circuit 108 may activate and/or deactivate at least one of the upper and/or lower semiconductor switches 206, 208, 210, 212, 404, 406 at predetermined time periods based on an operational status of the electric motor 112. The operational status of the electric motor 112 may represents the generating mode and/or the traction mode.

Figure 5:
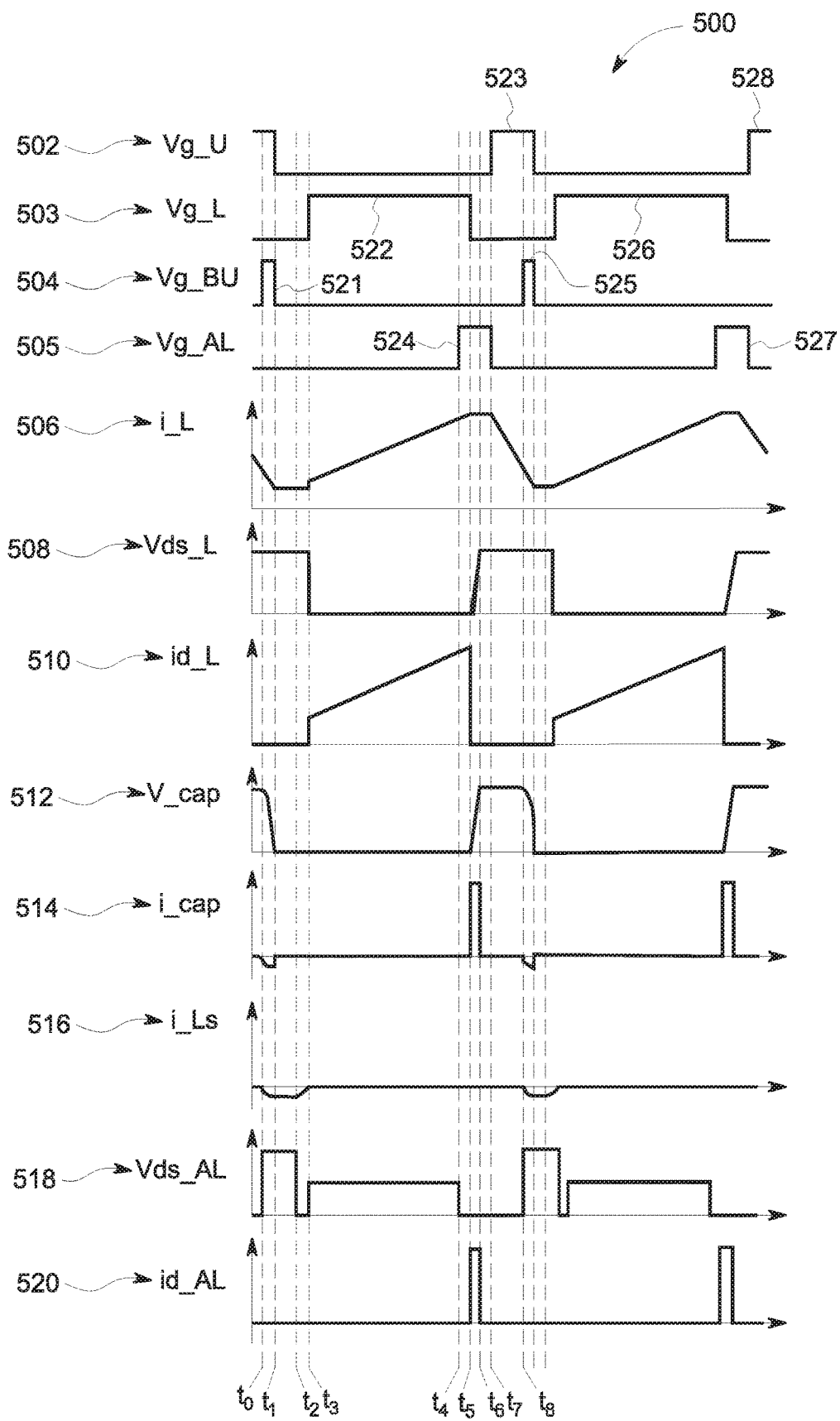
FIG. 5 illustrates a timing diagram of an embodiment of electrical waveforms of the bi-directional DC-DC converter shown in FIG. 4.

In connection with FIG. 5, based on the operational mode of the electric motor 112 the controller circuit 108 may activate and/or deactivate the at least one of the upper and/or lower semiconductor switches 206, 208, 210, 212, 404, 406 at predetermined intervals. For example, the timing diagram 500 shows the activation and/or deactivation of at least one of the upper and/or lower semiconductor switches 206, 208, 210, 212, 404, 406 to boost a DC voltage and/or current received by the power circuit 202 from the power source 102 to the power inverter circuit 106 based on the traction mode of the electric motor 112.

FIG. 5 illustrates a timing diagram 500 of an embodiment of electrical waveforms of the bi-directional DC-DC converter 104 with the soft switching topology 403 shown in FIG. 4. The electrical waveform 506 represents a current of the power circuit 202. It may be noted that the current shown in the electrical waveform 506 is shown above zero indicating the bi-directional DC-DC converter 104 with the soft switching topology 403 is operating in the continuous conduction mode. The electrical waveform 508 represents a voltage at the node 234. The electrical waveform 510 represents a current through the lower semiconductor switch 206. The electrical waveform 512 represents a voltage across the capacitor 232 and the electrical waveform 514 represents a current through the coupling circuit 224. The electrical waveform 516 represents a current through the resonant circuit 414. The electrical waveform 518 represents a voltage across the lower semiconductor switch 210 and the electrical waveform 520 represents a current through the lower semiconductor switch 210.

The electrical waveforms 502-505 represent a voltage along the control bus received by the switching circuits 250, 252, 402. The electrical waveform 502 represents a voltage of the gate terminal 221, the electrical waveform 503 represents a voltage of the gate terminal 220, the electrical waveform 504 represents a voltage of the gate terminal 408, and the electrical waveform 505 represents a voltage of the gate terminal 222. The electrical waveforms 502-505 include voltage peaks 521-528 representing activation of the corresponding semiconductor switches 206, 208, 210, and 408. For example, the voltage peaks 521-528 may be similar to and/or the same as the voltage peaks 320-325 shown in FIG. 3. A timing of the voltage peaks 521-528, such as the activation of the semiconductor switches 206, 208, 210, 408 is configured to boost the DC voltage received from the power supply 102 to the DC bus 116, which is received by the power inverter circuit 106.

The timing diagram 500 is subdivided into set time periods and/or divisions (e.g., $t_0$-$t_8$) based on the voltage peaks 521-528 representing a boost operation of the DC-DC converter 104 with the soft switching topology 403. At $t_0$, the upper semiconductor switch 208 is activated, for example, the control bus provides a voltage at the gate terminal 221 that is above the voltage threshold of the upper semiconductor switch 208. The controller circuit 108 activates the upper semiconductor switch 404 by adjusting the voltage along the control bus, shown as the voltage peak 521, conductively coupled to the gate terminal 408 above the voltage threshold. As shown between $t_0$ and $t_1$ of the electrical waveform 512, voltage of the coupling circuit 224 is discharged. For example, a current traverses from the coupling circuit 224 discharging the voltage from the coupling circuit 224 to the resonant circuit 414 (e.g., shown as a current by the electrical waveform 516).

At $t_1$, the controller circuit 108 deactivates the upper semiconductor switches 208 and 404 by adjusting the voltage along the control bus conductively coupled to the gate terminals 221 and 408 below the voltage threshold of the upper semiconductor switches 208 and 404. The coupling circuit 224 is discharged (e.g., as shown in the electrical waveform 512) through the diode 230 to the DC bus 116 (e.g., between $t_1$ and $t_2$, the energy stored in the capacitor 232 is transferred to the inductor 416 to be later transferred to the power inverter circuit 106 between $t_2$ and $t_3$).

At $t_2$, the electrical energy stored in the resonant circuit 414 is discharged. Additionally, the power circuit 202 is continuously providing voltage and/or current via the diode 228 of the upper semiconductor switch 208 to the DC bus 116.

At $t_3$, the controller circuit 108 activates the lower semiconductor switch 206 by adjusting the voltage along the control bus, shown as the voltage peak 522, conductively coupled to the gate terminal 220 above the voltage threshold. It may be noted that the current through the power circuit 202 starts increasing linearly, as shown in the waveform 506.

At $t_4$, the controller circuit 108 activates the lower semiconductor switch 210 by adjusting the voltage along the control bus conductively coupled to the gate terminal 222 above the voltage threshold represented as the voltage peak 524. Based on the activation of the lower semiconductor switch 206, current continually traverses from the power source 102 and the power circuit 202 through the lower semiconductor switch 206, which continually increases the current linearly across the power circuit 202 (e.g., as shown in the electric waveform 510).

At $t_5$, the controller circuit 108 deactivates the lower semiconductor switch 206 by adjusting the voltage along the control bus conductively coupled to the gate terminal 220 below the voltage threshold of the lower semiconductor switch 206. Current traverses from the power source 102 to the power circuit 202 and the coupling circuit 224 through the lower semiconductor switch 210, thereby charging the coupling circuit 224 (e.g., as shown in the electric waveform 512, 514). It may be noted that the voltage of the coupling circuit 224 is similar to and/or the same as the voltage across the node 234. For example, the voltage of coupling circuit 224 and the node 234 increases linearly a voltage and/or current of the DC bus 116 at a controller rate. The rate of rise of the voltage of the coupling circuit 224 and the node 234 is based on the coupling circuit 224 and the power inverter circuit 106. For example, the controlled rise is based on the electrical characteristics of the capacitor 232 of the coupling circuit 224 and/or the power inverter circuit 106.

At $t_6$, the current through the power circuit 202 continues to flow through the diode 228 and to the DC bus 116.

At $t_7$, the controller circuit 108 activates the upper semiconductor switch 208 by adjusting the voltage along the control bus, shown as the voltage peak 523, conductively coupled to the gate terminal 221 above the voltage threshold. The controller circuit 108 deactivates the lower semiconductor switch 210 by adjusting the voltage along the control bus conductively coupled to the gate terminal 222 below the voltage threshold of the lower semiconductor switch 210. It may be noted the activation of the upper semiconductor switch 208 represents a zero voltage switching. For example, power circuit 202 continually discharges energy (e.g., current, voltage) to the DC bus 116 across the diode 228 (shown in $t_6$), which holds the voltage across the upper semiconductor 208 to zero thereby enabling zero voltage switching. The power circuit 202 continues to discharge as represented by the linear reduction in current shown in the electric waveform 306.

The controller circuit 108 may continually and/or intermittently repeat the time periods $t_0$-$t_8$ based on the operational mode of the electric motor 112 to boost a DC voltage and/or current. It may be noted that when the controller circuit 108 determines an operational mode of the electric motor 112 to be the generating mode, the controller circuit 108 may instruct the bi-directional DC-DC converter to buck (e.g., decrease the DC voltage) the DC voltage and/or current received from the power inverter circuit 106 into another DC voltage and/or current that is configured to recharging and/or charge the power source 102.

In an embodiment, the controller circuit 108 is configured to reduce a voltage received by the power inverter circuit 106 based on activations and/or deactivations of at least one of the upper and/or lower semiconductor switches 206, 208, 210, 212, 404, 406 at predetermined intervals. For example, the controller circuit 108 may switch the activation and/or deactivation of the upper and/or lower semiconductor switches 206, 208, 210, 212, 404, 406 relative to the timing diagram 500 to reduce the voltage and/or current along the DC bus 116 and delivered to the power source 102.

Figure 6:
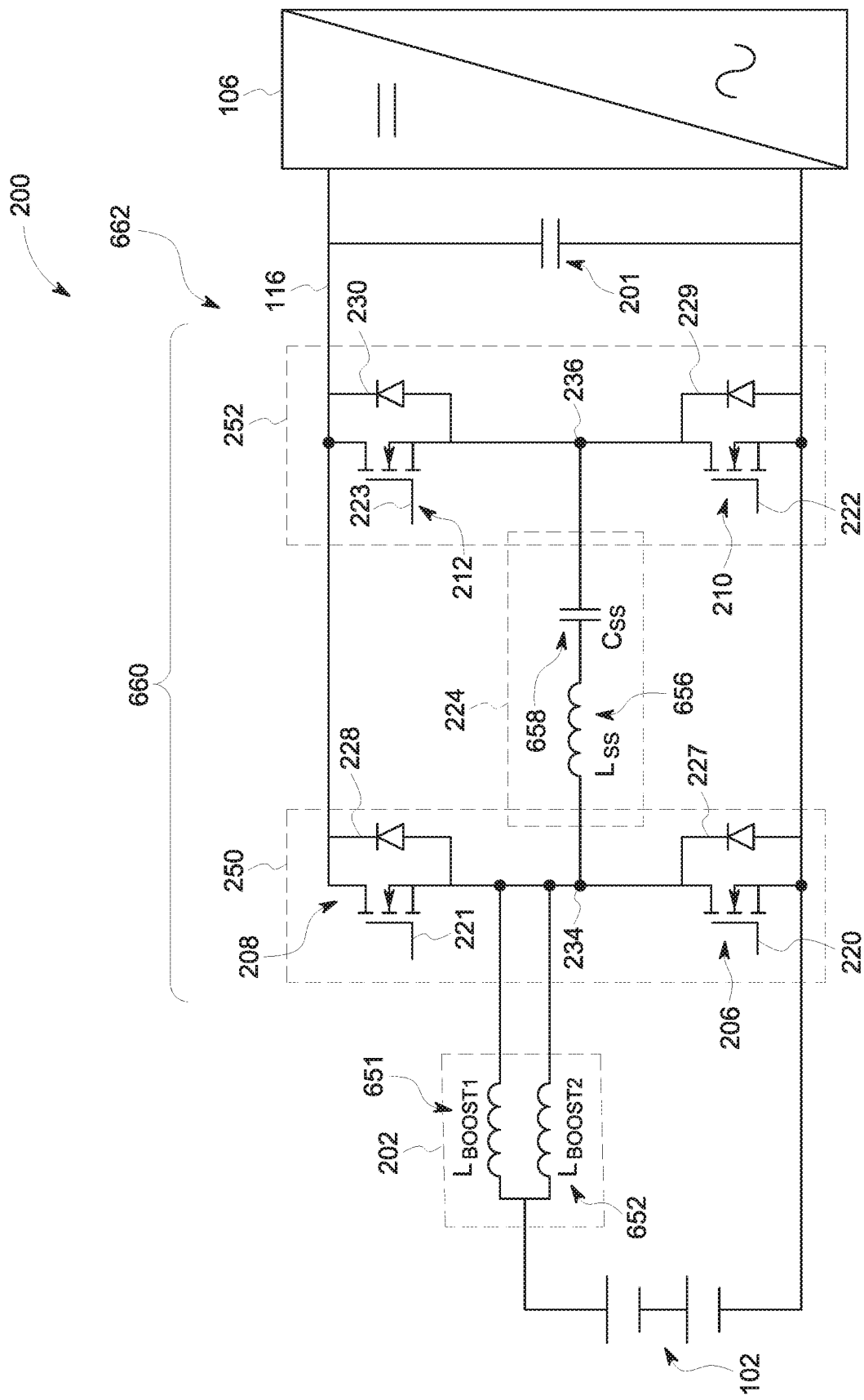
FIG. 6 illustrates a schematic illustration of an embodiment of a soft switching topology for an interleaved DC-DC converter.

Additionally or alternatively, in connection with FIG. 6, the soft switching topology 660 (e.g., the switching circuit 252, the coupling circuit 224) may be configured to form an interleaved boost DC-DC converter 662. For example, the interleaved boost DC-DC converter 662 is configured to boost a voltage and/or current of the power source 102 to a higher DC voltage and/or current along the DC bus 116 utilizing a plurality of phases.

FIG. 6 illustrates a schematic illustration 650 of an embodiment of the soft switching topology 660 for the interleaved boost DC-DC converter 662. The power circuit 202 includes two inductors 651 and 652 configured in parallel with each other. For example, the soft switching topology 660 may be configured to interleave the switching circuits 250 and 252 based on a coupling circuit 224. The coupling circuit 224 may include an inductor 656 in series with a capacitor 658. The coupling circuit 224 is configured such that the switching circuits 250 and 252 are utilized to boost power to the DC bus 116 by having the switching circuits 250 and 252 operating at different phases with respect to each other. For example, the coupling circuit 224 is configured to adjust a phase of the switching circuit 252 by 180° with respect to the switching circuit 250 as shown by the electrical waveforms 702-713 to define the interleaved boost DC-DC converter 662.

Figure 7A:
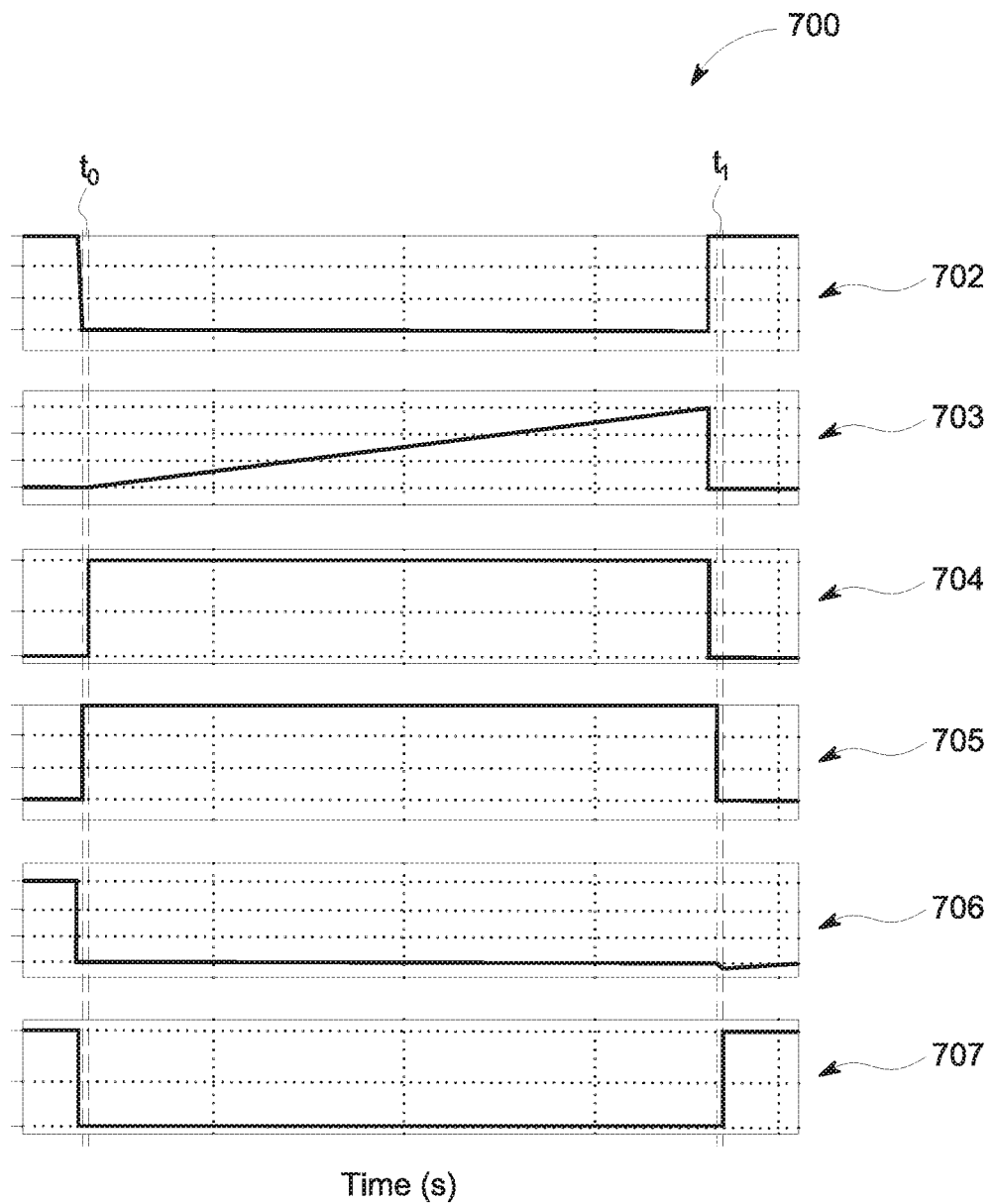
FIGS. 7A-B illustrate timing diagrams of electrical waveforms of the interleaved DC-DC converter shown in FIG. 6.
Figure 7B:
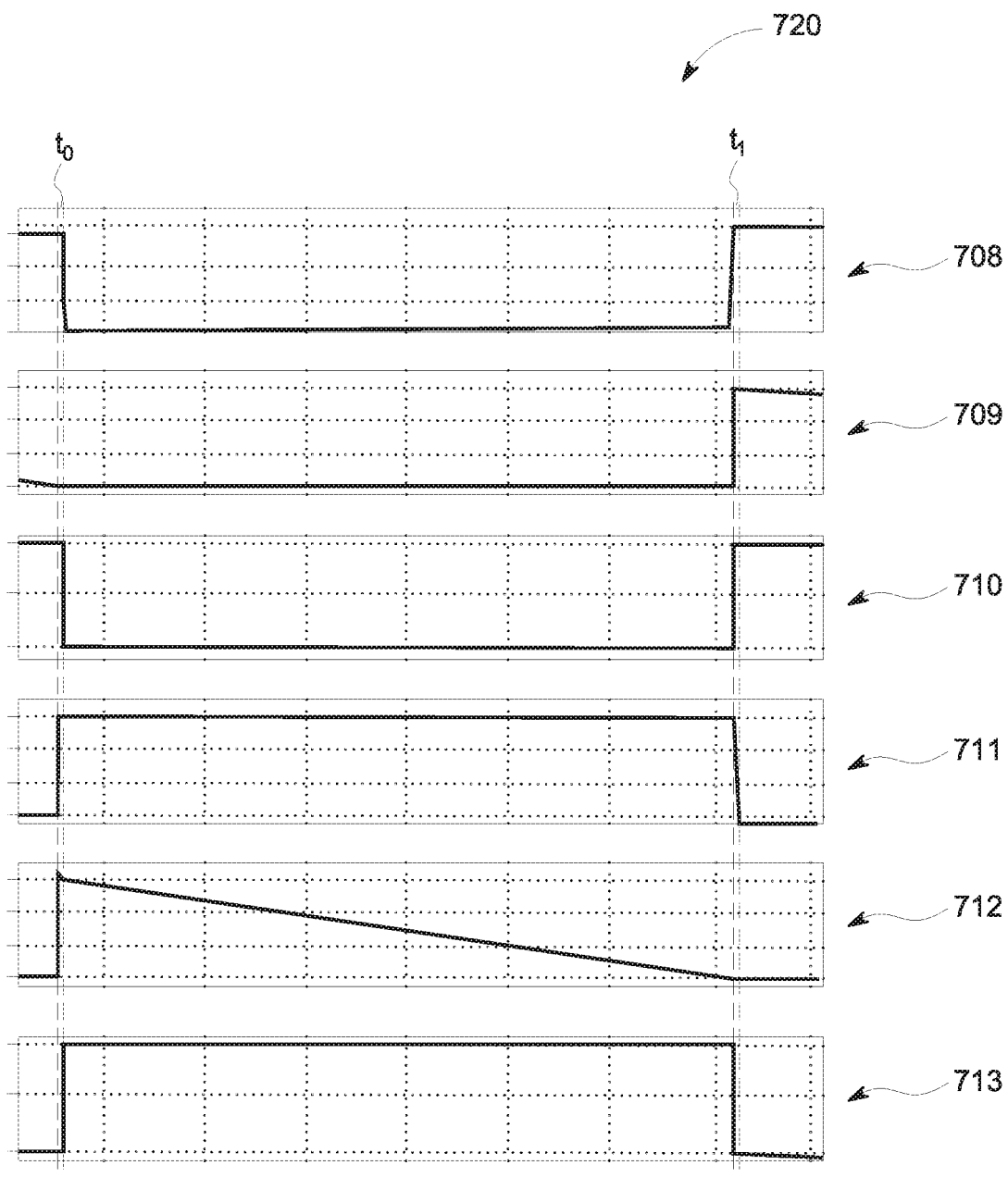

FIGS. 7A-B illustrate timing diagrams 700, 720 of the electrical waveforms 702-713 of the interleaved DC-DC converter 662 shown in FIG. 6. The electrical waveform 702 represents a voltage across and the electrical waveform 703 represents a current through the lower semiconductor switch 206. The electrical waveform 704 represents a voltage at the gate terminal 220. The electrical waveform 705 represents a voltage across and the electrical waveform 706 represents a current through the lower semiconductor switch 210. The electrical waveform 707 represents a voltage at the gate terminal 222. The electrical waveform 708 represents a voltage across and the electrical waveform 709 represents a current through the upper semiconductor switch 208. The electrical waveform 710 represents a voltage at the gate terminal 221. The electrical waveform 711 represents a voltage across and the electrical waveform 712 represents a current through the upper semiconductor switch 223. The electrical waveform 713 represents a voltage at the gate terminal 223.

The timing diagrams 700, 720 are subdivided into set time periods and/or divisions (e.g., $t_0$-$t_1$) corresponding to activation of the upper and/or lower semiconductor switches 206, 208, 210, 212 of the interleaved DC-DC converter 662 with the soft switching topology 660. It may be noted that at least a portion of the energy accumulated in the power circuit 202 (e.g., the inductors 651, 652) during the time periods of the timing diagrams 700, 720 of one of the switching circuits 250, 252 is utilized to discharge the energy of the coupling circuit 224 in the other switching circuits 252, 250 prior to activation of the associated upper and/or lower semiconductor switch 206, 208, 210, 212. The coupling circuit 224 operates as a resonant circuit based on the inductor 656 and capacitor 658, which is utilized to generate a negative current. The negative current is used to discharge the capacitance of the alternative semiconductor switch 206, 208, 210, 212 prior to the controller circuit 202 activating the upper and/or lower switch 206, 208, 210, 212 along the control bus. Based on the discharge, the lower semiconductor switches 206 and 210 are activated at zero voltage switching operation, and the upper semiconductor switches 208 and 212 are activated at zero current operation.

For example, at $t_0$, the lower semiconductor switch 206 and upper semiconductor switch 212 are activated. It may be noted at $t_0$ the electrical waveform 702 indicate no voltage across the lower semiconductor switch 206, and the electrical waveform 712 indicate no current through the upper semiconductor switch 212 when activated. For example, the lower semiconductor switch 206 is activated at a zero voltage switching operation, and the upper semiconductor switch 212 is activated at a zero current switching operation. The control bus provides a voltage at the gate terminals 220 and 223 above the voltage thresholds of the lower and upper semiconductor switches 206 and 208. As shown between $t_0$ and $t_1$ of the electrical waveforms 703 and 712, current traverses through the lower and upper semiconductor switches 206, 212. For example, electrical energy is discharged in the power circuit 202 (e.g., by the inductors 651 and 652) by the switching circuit 250 shown as a positive current in the electrical waveform 703. In another example, electrical energy accumulated in the coupling circuit 224, such as by the capacitor 658, is discharged by the switching circuit 252 shown as a decrease in current through the upper semiconductor switch 212 shown as the electrical waveform 712.

At $t_1$, the controller circuit 108 deactivates the lower and upper semiconductor switches 206 and 212 by adjusting the voltage along the control bus conductively coupled to the gate terminals 220 and 223 below the voltage threshold. The controller circuit 108 activates the lower and upper semiconductor switches 210 and 208. Electrical energy is accumulated in the power circuit 202 (e.g., by the inductors 651 and 652) by the switching circuit 250 shown as a negative current in the electrical waveform 706. In another example, electrical energy is accumulated in the coupling circuit 224, such as at the capacitor 658, by the switching circuit 252 shown as an increase in current through the lower semiconductor switch 210 shown as the electrical waveform 712.

Figure 8:
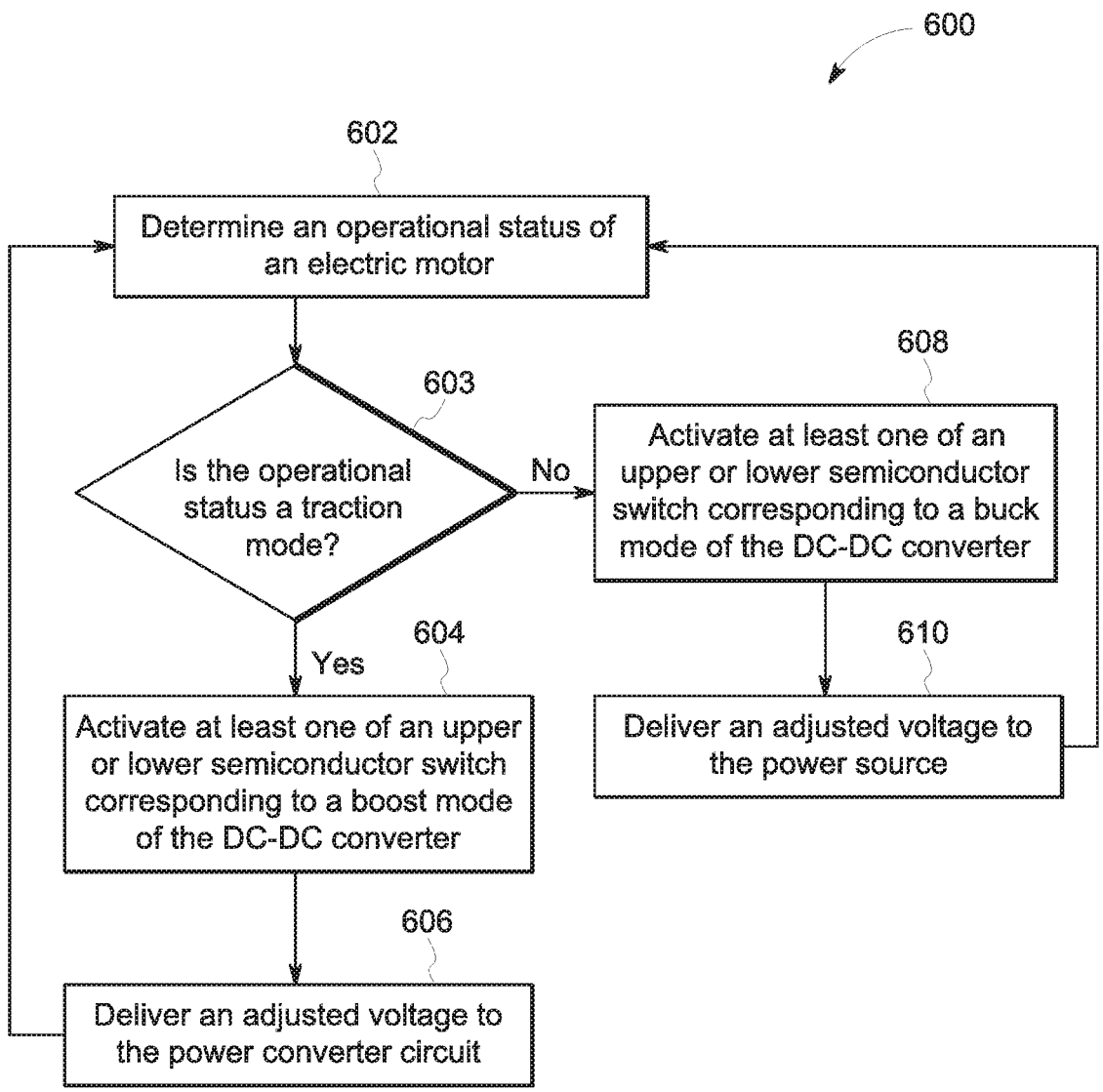
FIG. 8 is a flow chart of an embodiment of a method for soft switching a DC-DC converter.

FIG. 8 is a flow chart of an embodiment of a method for soft switching a DC-DC converter. The method 600, for example, may employ or be performed by structures or aspects of various embodiments discussed herein. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. In various embodiments, portions, aspects, and/or variations of the method 600 may be able to be used as one or more algorithms to direct hardware to perform one or more operations described herein.

Beginning at 602, determining an operational status of the electric motor 112. The operational status of the electric motor 112 may represent the generating mode and/or the traction mode. The controller circuit 108 may determine the operational status of the electric motor 112 based on a sensor (not shown) measuring a voltage and/or current of the DC bus 116. Additionally or alternatively, the controller circuit 108 may determine the operational status of the electric motor 112 based on operation of the vehicle, such as by activation of pedals of the vehicle. For example, activation of the gas and/or accelerator pedal may indicate to the controller circuit 108 that the electric motor 112 is operating in the traction mode. Alternatively, activation of the brake pedal may indicate to the controller circuit 108 that the electric motor 112 is operating in the generating mode.

At 603, the controller circuit 108 determines whether the electric motor 112 is in a traction mode. For example, based on the activation of the gas and/or accelerator pedal the controller circuit 108 may determine that the electric motor 112 is in a traction mode.

If the electric motor 112 is in the traction mode, then at 604, the controller circuit 108 is configured to activate at least one of an upper or lower semiconductor switches 206, 208, 210, 212 corresponding to a boost mode of the DC-DC converter 104 with the soft switching topology 203. For example, the controller circuit 108 may activate at least one of an upper or lower semiconductor switches 206, 208, 210, 212 by adjusting a voltage along the control bus corresponding to the electric waveforms 302-304. In another example, the controller circuit 108 may activate at least one of an upper or lower semiconductor switches 206, 208, 210, 212, 404, 406 by adjusting a voltage along the control bus corresponding to the electric waveforms 502-505.

At 606, the controller circuit 108 is configured to deliver the adjusted voltage to the power converter circuit 106. For example, the controller circuit 108 based on the activation of at least one of an upper or lower semiconductor switches 206, 208, 210, 212 may deliver the boosted voltage of the power source 102 along the DC bus 116 conductively coupled to the power converter circuit 106.

If the electric motor 112 is not in the traction mode (e.g., generating mode), then at 608, the controller circuit 108 is configured to activate at least one of an upper or lower semiconductor switches 206, 208, 210, 212 corresponding to a buck mode of the DC-DC converter 104 with the soft switching topology 203. For example, the controller circuit 108 may switch the activation and/or deactivation of the upper and/or lower semiconductor switches 206, 208, 210, 212 relative to the timing diagram 300 to reduce the voltage and/or current along the DC bus 116 and delivered to the power source 102.

At 610, the controller circuit 108 is configured to deliver the adjusted voltage to the power source 102. For example, the controller circuit 108 based on the activation of at least one of an upper or lower semiconductor switches 206, 208, 210, 212 may deliver the reduced or bucked voltage of the DC bus 116 received from the power converter circuit 106 to the power circuit 202, which is conductively coupled to the power source 102.

It should be noted that the particular arrangement of components (e.g., the number, types, placement, and/or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optic drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A soft switching system for a direct current (DC)-DC converter comprising:
    a DC bus;
    a power source;
    a buck/boost converter coupled between the power source and the DC bus, the buck/boost converter comprising:
        a first switching circuit coupled to the DC bus, the first switching circuit having an upper first semiconductor switch, a lower first semiconductor switch, and a first node interposed therebetween;
        a second switching circuit coupled to the DC bus, the second switching circuit having an upper second semiconductor switch, a lower second semiconductor switch, and a second node interposed therebetween;
        a coupling circuit coupled between the first and second nodes, the second switching circuit configured to control charging and discharging of the coupling circuit to allow for soft switching of the first switching circuit and second switching circuit; and
        a power circuit coupled between the first node and the power source, the power circuit configured to store electrical energy and discharge electrical energy.

2. The soft switching system of claim 1, further comprising a controller circuit coupled to the first and second switching circuits, the controller circuit configured to activate at least one of the upper first semiconductor switch, lower first semiconductor switch, upper second semiconductor switch, and lower second semiconductor switch based on an operation of an electric motor.

3. The soft switching system of claim 2, wherein the power circuit is configured to hold a voltage across at least one of the lower first semiconductor switch and lower second semiconductor switch such that the controller circuit activates the lower semiconductor switch at a zero voltage switching.

4. The soft switching system of claim 2, wherein the power circuit is configured to hold a voltage across at least one of the upper first semiconductor switch and upper second semiconductor switch such that the controller circuit activates the upper semiconductor switch at a zero voltage switching.

5. The soft switching system of claim 1, wherein the first switching circuit, second switching circuit, coupling circuit, and power circuit are configured to operate in a discontinuous conduction mode.

6. The soft switching system of claim 2, wherein the controller circuit is configured to operate the first switching circuit and second switching circuit to boost a voltage received by the power circuit.

7. The soft switching system of claim 2, wherein the controller circuit is configured to operate the first switching circuit and second switching circuit to reduce a voltage received by a power inverter circuit.

8. The soft switching system of claim 1, further comprising:
    a third switching circuit having an upper third semiconductor switch, a lower third semiconductor switch, and a third node coupled therebetween; and
    a resonant circuit coupled between the second node and a third node, the resonant circuit configured to transfer energy stored in the coupling circuit to allow for soft switching of the third switching circuit.

9. The soft switching system of claim 8, further comprising a controller circuit coupled to the first, second, and third switching circuits, the controller circuit configured to activate at least one of the upper first semiconductor switch, lower first semiconductor switch, upper second semiconductor switch, lower second semiconductor switch, upper third semiconductor switch, and lower third semiconductor switch based on an operation of an electric motor.

10. The soft switching system of claim 8, wherein the first switching circuit, second switching circuit, third switching circuit, coupling circuit, and power circuit are configured to operate in a discontinuous conduction mode or a continuous conduction mode.

11. The soft switching system of claim 1, wherein the power circuit comprises an inductor coupled to a power source.

12. The soft switching system of claim 1, wherein the first switching circuit and second switching circuit are operated at different phases with respect to each other.

13. A method for soft switching a buck/boost direct current (DC)-DC converter, the buck/boost DC-DC converter including a first switching circuit, a second switching circuit, a coupling circuit coupled between the first switching circuit and second switching circuit, and a power circuit coupled to the first switching circuit, the method comprising:
    determining an operational status of an electric motor;
    controlling an upper first semiconductor switch and lower first semiconductor switch of the first switching circuit and upper second semiconductor switch and lower second semiconductor switch of the second switching circuit based on the operational status of the electric motor;
    storing electrical energy of the coupling circuit when the lower first switch is deactivated and discharging electrical energy of the coupling circuit when the upper first switch is deactivated to allow for soft switching of the first switching circuit and second switching circuit; and
    delivering an adjusted voltage to one of the electric motor and the power circuit based on the operational status of the electric motor.

14. The method of claim 13, further comprising holding a voltage across at least one of the upper first semiconductor switch, lower first semiconductor switch, upper second semiconductor switch, and lower second semiconductor switch such that the activation operation represents a zero voltage switching.

15. The method of claim 13, further comprising operating the first switching circuit, second switching circuit, coupling circuit, and power circuit in a discontinuous conduction mode.

16. The soft switching system of claim 1, wherein the coupling circuit comprises a snubber circuit.

17. The soft switching system of claim 8, wherein the resonant circuit comprises an inductor.

18. The soft switching system of claim 12, wherein the coupling circuit comprises an inductor coupled to a capacitor.

19. The soft switching system of claim 12, wherein the power circuit comprises at least two inductors coupled in parallel to each other.

20. A soft switching system for a direct current (DC)-DC converter comprising:
- a DC bus;
- a buck/boost converter coupled to the DC bus, the buck/boost converter comprising:
  - a first switching circuit coupled to the DC bus, the first switching circuit having an upper first semiconductor switch, a lower first semiconductor switch, and a first node interposed therebetween;
  - a second switching circuit coupled to the DC bus, the second switching circuit having an upper second semiconductor switch, a lower second semiconductor switch, and a second node interposed therebetween;
  - a coupling circuit coupled between the first and second nodes, the coupling circuit comprising a snubber circuit, the second switching circuit configured to control charging and discharging of the coupling circuit to allow for soft switching of the first switching circuit and second switching circuit; and
  - a power circuit coupled to the first node, the power circuit comprising an inductor and configured to store electrical energy and discharge electrical energy.

* * * * *